Dec. 7, 1926.  1,609,868
H. M. ELLER
WATER HEATER
Filed June 30, 1924   2 Sheets-Sheet 1

Inventor:
Harley M. Eller.
by R. W. Smith
Attorney

Dec. 7, 1926.  H. M. ELLER  1,609,868
WATER HEATER
Filed June 30, 1924   2 Sheets-Sheet 2
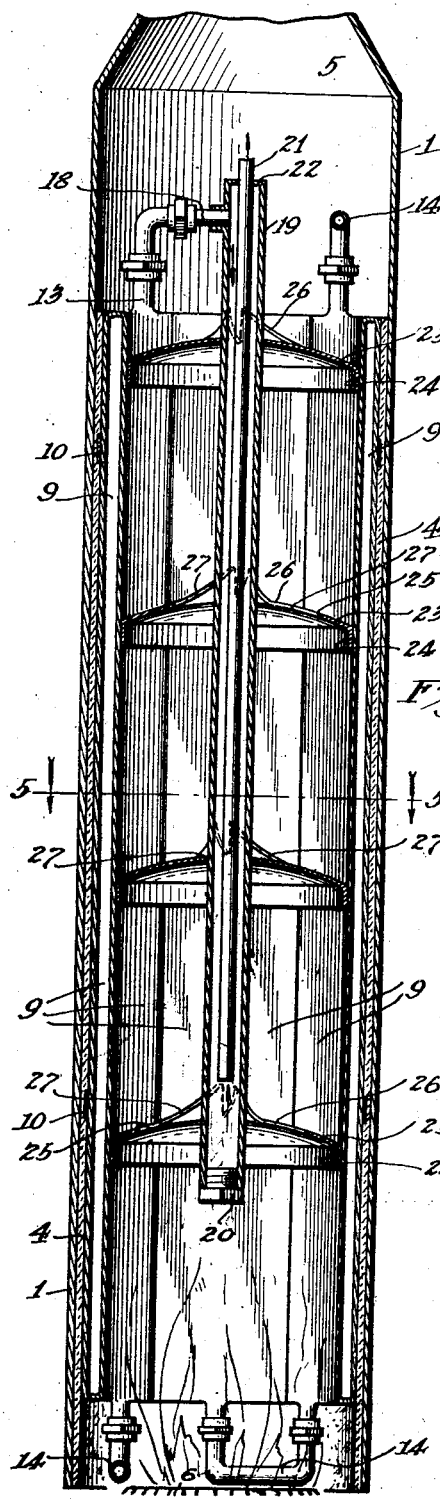
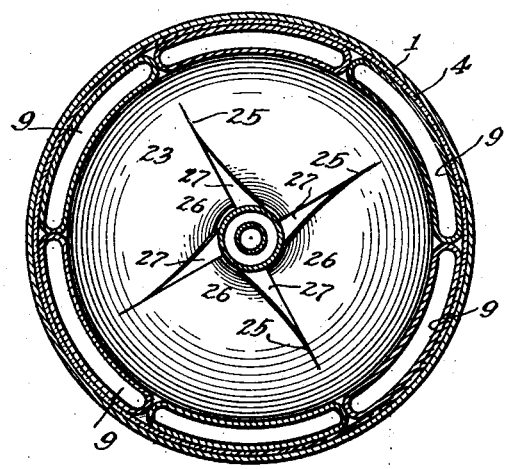
Fig.5.
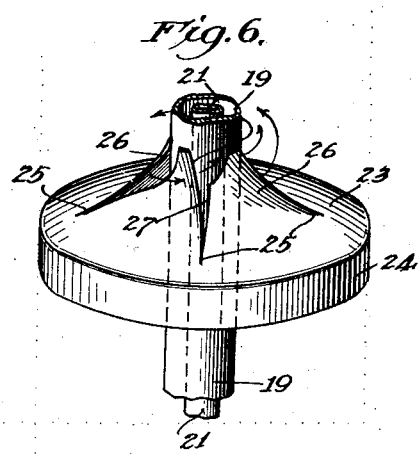
Fig.6.
Inventor:
Harley M. Eller.
by R. W. Smith
Attorney Patented Dec. 7, 1926.

1,609,868

UNITED STATES PATENT OFFICE.

HARLEY M. ELLER, OF LOS ANGELES, CALIFORNIA, ASSIGNOR OF ONE-HALF TO LUTHER R. McGARVIN, OF LOS ANGELES, CALIFORNIA.

WATER HEATER.

Application filed June 30, 1924. Serial No. 723,226.

It is the object of this invention to provide a water heater in which a maximum heating surface of the water chamber is exposed to the heat, and in which the water flows in a circuitous course through said water chamber for efficient heating thereof.

It is a further object of the invention to provide for final intense heating of the water before its discharge from the heater, by directing the major portion of the heat against that portion of the water passage which forms the discharge; and to also provide for spiral passage of the heat around said discharge end of the water passage, for maximum heating efficiency.

It is a still further object of the invention to form a liquid seal in the water passageway adjacent its discharge end, so as to eliminate the passage of air or the creation of a partial vacuum in the water circulating system.

It is a still further object of the invention to provide a heater of simplified construction, and which may be readily assembled or taken apart for repairs and the like.

The invention will be readily understood from the following description of the accompanying drawings, in which:

Fig. 4 is a vertical section on the line 4—4 of Fig. 2.

Fig. 5 is a transverse section on the line 5—5 of Fig. 4.

Fig. 6 is a perspective view of one of the baffles.

Figure 1:
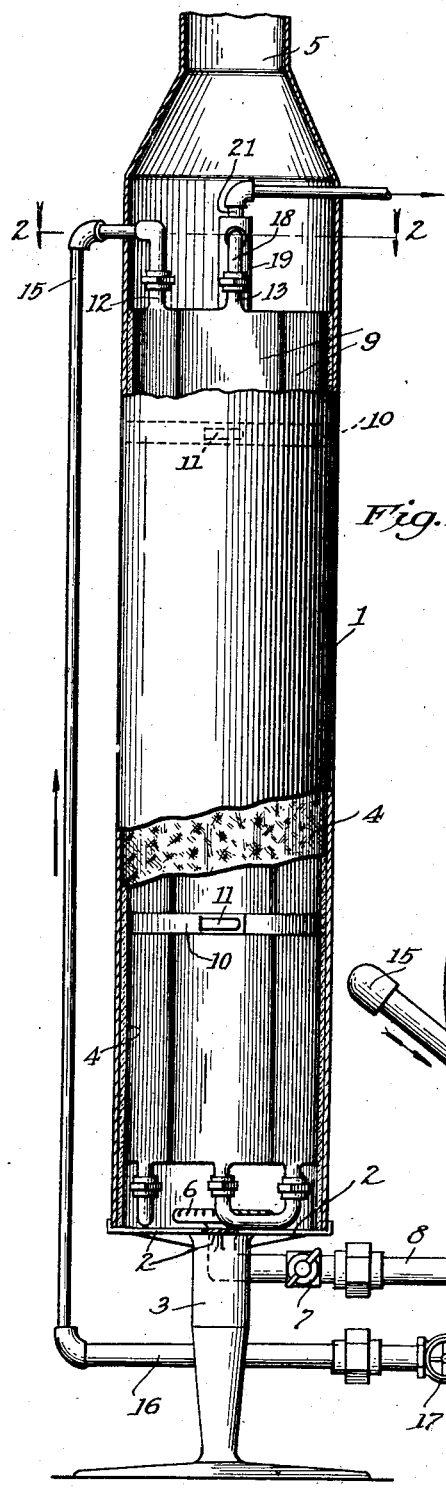
Fig. 1 is a front elevation of the heater with the outer shell and the heat resisting lining partly broken away.
Figure 3:
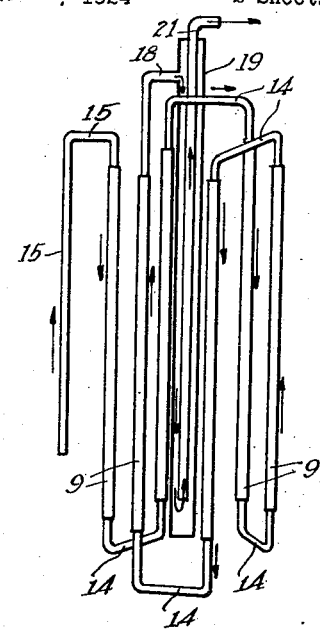
Fig. 3 is a diagram of the water circulation through the heater.
Figure 2:
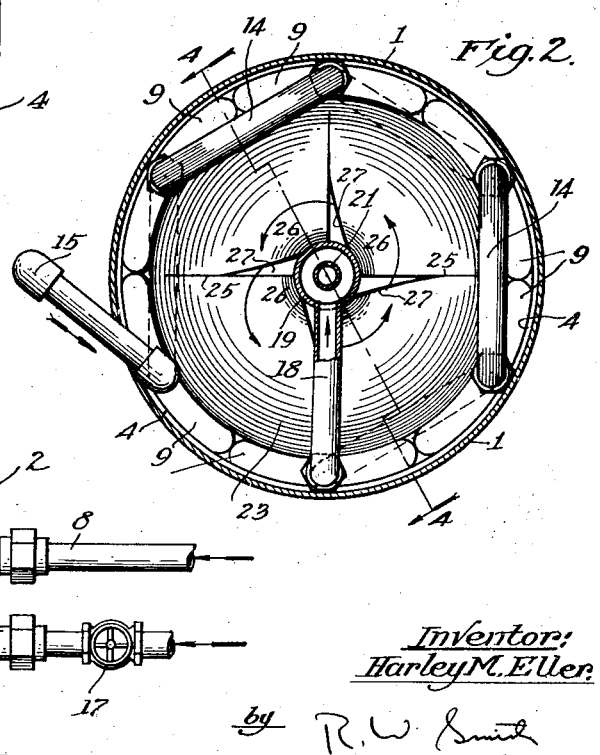
Fig. 2 is a transverse section on the line 2—2 of Fig. 1.

The heater comprises an annular, elongated outer shell 1 mounted in upright position upon radial arms 2 of a standard 3. A lining 4 of suitable heat resisting material such as asbestos may be provided on the inner wall of shell 1. The upper end of the shell forms a usual chimney 5, and the lower end of said shell is open for admission of air between the radial arms 2.

A burner 6 is mounted in the lower end of shell 1 and has a valvular control 7 for its fuel supply pipe 8. The valvular control forms no part of the present application, and in practice may be any desired type of either manual or automatic valve.

The main water chamber of the heater is mounted in shell 1 against the lining 4, and forms an annulus adapted for the passage of heat from burner 6 through the same. The water chamber comprises a series of elongated closed casings 9, arcuate in cross-section, and assembled in shell 1 so as to form a closed annulus open at its respective ends and fitting snugly in the shell. The casings 9 are fixed relative to one another by retaining bands 10 received around the same and fastened at their ends as shown at 11.

One of the casings 9 has an inlet 12, preferably at its upper end, the water entering said casing through said inlet flowing downwardly therethrough, and thence in opposite directions through succeeding casings, until final discharge of said water through an outlet 13 in the upper end of the last casing of the annular series.

As an instance of this arrangement, conduits 14 alternately connect the upper and lower ends of next adjacent casings 9 of the annular series, said conduits at the lower ends of said casings resting upon supporting arms 2 for maintaining the water chamber in position relative to the outer shell.

Inlet 12 is connected to a pipe 15 which extends outwardly through the wall of shell 1, and thence downwardly for connection to a usual water main 16 having a valvular control 17.

Outlet 13 is connected by conduit 18, to a vertical pipe 19 depending concentrically through the heating passageway formed within the annulus of the water chamber, said vertical pipe being supported by conduit 18, and preferably terminating short of the bottom of shell 1, with its lower end closed by plug 20.

A discharge conduit 21 is mounted in pipe 19, the lower end of said discharge conduit being spaced above the lower end of said pipe, and the upper end of said discharge conduit projecting above the pipe. The upper end of pipe 19 is closed around the discharge conduit as shown at 22, and suitably fixed thereto as by welding, in order to support the conduit relative to the pipe. The upper end of the discharge conduit extends outwardly through the wall of shell 1, and leads to any desired point of use for the hot water.

Baffles 23 are provided in the heat passageway formed by the annular water chamber, said baffles comprising domes mounted on pipe 19 and having depending flanges 24 at their outer peripheries received against the walls of casings 9.

The baffles have slits 25 radiating from pipe 19 and terminating in spaced relation from the peripheries of said baffles, and one edge of each of said slits is bent upwardly to form a vane 26, so that openings 27 are formed in said baffles adjacent pipe 19, with the vanes at the edges of said openings inclined in the same direction circumferentially of said pipe. The ends of the vanes rest against the pipe 19 and may be fixed thereto by welding or the like, for supporting the baffles in the heat passageway.

In the construction as thus described, the main water chamber presents a maximum surface to the heat passageway extending through the annulus formed by said chamber, and the connections between the casings forming the main water chamber, provide for flow of the water through succeeding casings in opposite directions longitudinally of said heat passageway.

The heat passing through the annulus formed by the main water chamber, will strike baffles 23 for radiating said heat, and the heat passing upwardly through openings 27 will be deflected spirally around pipe 19 to cause intense heating of the water therein, just prior to its discharge from the heater.

The construction of pipe 19 and discharge conduit 21, will maintain the lower end of the latter submerged in the water in said pipe, thereby maintaining a liquid seal for preventing the passage of air through the water system.

The conduits connecting the casings 9 are held in place by usual pipe couplings, so that they may be readily detached for removing and replacing units of the main water chamber, thereby providing an extremely simple but practical construction.

It will be apparent that various changes may be made in the construction, combination, and arrangement of parts as thus described, without departing from the spirit of the invention.

I claim:

1. A water heater comprising an annular shell, means for heating the passage through said shell, a pipe longitudinally disposed in said passage, and a baffle in said passage completely closing the same except for openings therethrough adjacent said pipe, said openings being arranged to deflect the heat therethrough in a spiral course around said pipe.

2. A water heater comprising an annular shell, means for heating the passage through said shell, a pipe longitudinally disposed in said passage, a baffle extending across said passage between said pipe and said shell, said baffle having circumferentially spaced slits therein radiating from said pipe with one edge of said slits inclined relative to the length of said pipe so as to form openings through said baffle at said pipe adapted to cause spiral passage of the heat around said pipe.

3. A heater comprising a series of upright casings assembled so as to form a closed annulus having an upright central passage opening therethrough, means for heating said passage, an intake for fluid connected to one of the casings, conduits alternately connecting succeeding casings at opposite ends thereof for flow of fluid through succeeding casings in opposite directions longitudinally of the central passage, a pipe connected to the last of the succeeding casings and extending downwardly through the central passage for flow of fluid downwardly therethrough, said pipe being closed at its lower end, and a conduit in said pipe forming a discharge at its upper end and open at its lower end to said pipe in spaced relation from the closed lower end of the latter.

4. A heater comprising a series of casings assembled so as to form a closed annulus having a central passage opening therethrough, the casings being arranged for flow of a fluid from one casing to another with the flow in succeeding casings moving in opposite directions longitudinally of the central passage, means for heating the central passage, and an offtake pipe from the last of the succeeding compartments extending through the central passage.

5. A heater comprising an annular chamber having a central passage opening therethrough, the annular chamber comprising a series of compartments arranged for flow of a fluid from one compartment to another with the flow in succeeding compartments moving in opposite directions longitudinally of the central passage, means for heating the central passage, an offtake pipe extending from the last of the succeeding compartments longitudinally through the central passage, and a baffle extending across the central passage and having an opening therethrough at the offtake pipe.

6. A heater comprising an annular shell, means for heating the passage through said shell, a pipe extending longitudinally through said passage, and a baffle having a central opening adapted for the reception of the pipe therethrough, said baffle forming vanes at the central opening with openings through the baffle between the vanes, and the vanes engaging the pipe for supporting the baffle thereon.

7. A heater comprising a series of casings assembled so as to form a closed annulus having a central passage opening therethrough, the casing being arranged for flow of a fluid from one casing to another with the flow in succeeding casings moving in opposite directions longitudinally of the central passage, means for heating the central passage, an offtake pipe extending from the last of the succeeding casings longitudinally through the central passage, and means in the central passage for directing the heat against the offtake pipe.

8. A heater comprising a series of casings assembled so as to form a closed annulus having a central passage opening therethrough, the casings being arranged for flow of a fluid from one casing to another with the flow in succeeding casings moving in opposite directions longitudinally of the central passage, means for heating the central passage, an offtake pipe from the last of the succeeding casings extending through the central passage, and a liquid seal for the offtake pipe.

In testimony whereof I have affixed my signature to this specification.

HARLEY M. ELLER.